United States Patent
Bahir

(10) Patent No.: US 7,937,290 B2
(45) Date of Patent: May 3, 2011

(54) METHOD AND SYSTEM FOR THE SALE OF MEDICAL ITEMS

(76) Inventor: Shiri Bahir, Tel-Aviv (IL)

( * ) Notice: Subject to any disclaimer, the term of this patent is extended or adjusted under 35 U.S.C. 154(b) by 1143 days.

(21) Appl. No.: 11/020,168

(22) Filed: Dec. 27, 2004

(65) Prior Publication Data

US 2006/0155607 A1    Jul. 13, 2006

(51) Int. Cl.
*G06Q 30/00* (2006.01)
(52) U.S. Cl. ......................................................... 705/26
(58) Field of Classification Search .................... 705/26, 705/27
See application file for complete search history.

(56) References Cited

U.S. PATENT DOCUMENTS

| | | | |
|---|---|---|---|
| 2002/0087413 A1* | 7/2002 | Mahaffy et al. | 705/16 |
| 2003/0216831 A1 | 11/2003 | Hart | |
| 2004/0049455 A1* | 3/2004 | Mohsenzadeh | 705/40 |
| 2004/0204954 A1 | 10/2004 | Lacko | |
| 2004/0210488 A1 | 10/2004 | Doherty | |
| 2007/0124216 A1* | 5/2007 | Lucas | 705/27 |
| 2008/0249658 A1* | 10/2008 | Walker et al. | 700/236 |

FOREIGN PATENT DOCUMENTS

JP    10-334326 A    12/1998

* cited by examiner

*Primary Examiner* — Mila Airapetian
(74) *Attorney, Agent, or Firm* — Blank Rome LLP

(57) ABSTRACT

A system and method for selling medical items. The system comprises one or more vending machines and a service center. The system further comprises a communications network used to allow communication between a communication device located at a vending machine and a communication device located at the service center. An individual contemplating the purchase of a medical item from one of the vending machines can consult with a pharmacist located at the service center before making a purchase from the vending machine. In one embodiment of the invention, a purchase may be made at one of the vending machines only after the purchase has been approved by a pharmacist at the service center.

24 Claims, 3 Drawing Sheets

METHOD AND SYSTEM FOR THE SALE OF MEDICAL ITEMS

FIELD OF THE INVENTION

This invention relates to methods and systems for selling items, and more specifically to such methods and systems involving vending machines.

BACKGROUND OF THE INVENTION

As used herein the term "medical item" is used to indicate any item that is introduced into the body or applied to the body. Such medical items include, for example, medicines and other substances introduced into the body or applied to the body as well as items that are not medicines, such as a bandages and splints.

Although vending machines are widely used for the sale of a variety of products, the use of vending machines for the sale of medical items has not found wide use. An individual wishing to purchase a medical item often wants to consult with a pharmacist before making a purchase. An individual at a vending machine offering medical items for sale is unable to consult with a pharmacist. In this case, the individual will often decide not to purchase a medical item from the vending machine and will delay purchasing a medical item until be arrives at a pharmacy where he can consult with a pharmacist.

The abstract to Japan Patent 10334326 discloses an automatic vending machine having a computer with means for storing and processing information on "general medicines or the like". A computer system has a program display device such as a CRT for displaying information, and input means such as a touch panel for selecting the general medicines or the like out of the displayed information. The vending machine also has means for vending the selected general medicines or the like.

SUMMARY OF THE INVENTION

The present invention provides a system and method for the sale of medical items. The invention is particularly useful for the sale of medical items not requiring a prescription from a doctor or other qualified medical professional. Such medical items are sometimes referred to as "over the counter", or "OTC", medical items.

The system of the invention comprises one or more vending machines offering one or more medical items for sale. In accordance with the invention, the system also includes a service center. A communication device is used that allows an individual contemplating the purchase of a medical item from one of the vending machines to communicate with a pharmacist located at the service center. In one embodiment of the invention, the individual uses his personal mobile phone to contact the service center. In this case, instructions for contacting the service center using the mobile telephone are provided at the vending machine. Such instructions would typically include a telephone number of the service center. In a preferred embodiment, one or more of the vending machines is provided with an integral communication device that is used by an individual contemplating a purchase from the vending machine to contact the service center.

Communication between a vending machine and the service center is over a communication network that may be, for example, a wired network such as a public switched telephone network (PSTN), in which case the communication devices are telephones wired to the communication system. Alternatively, the communication network may be a wireless communication network, e.g. a cellular telephone network, in which case the communication devices are wireless telephones. In a preferred embodiment, the communication network is a computer network such as the Internet an Intranet or a local access network (LAN). In this embodiment, the communication devices include a computer terminal, a microphone and a speaker. In a preferred embodiment, the communication devices include a video camera, that allows the individual and the pharmacist to view each other on their display screens by video conferencing during communication between them.

The individual may decide to contact the pharmacist if, for example, the individual is not certain which of the medical items offered for sale by one of the vending machines is most suitable for his needs. This would be the case, for example, if the subject is in a locality, such as a foreign country, where he is not familiar with locally available medical items, or cannot read the labels of the medical items offered for sale. The individual informs the pharmacist as to the individual's need for a medical item, for example, a particular medical problem that the individual has. The pharmacist then informs the individual of a medical item offered for sale at the vending machine meeting the individual's needs.

In one embodiment of the method of the invention, when the individual has decided which medical item to purchase from the vending, he indicates his selection to the vending machine and pays for the item. The purchased item is them dispensed from the vending machine. The individual takes the purchased item and the transaction is completed.

Another embodiment of the method of the invention may be used in locations where purchasing of the medical items offered for sale by a vending machine of the system requires approval from a pharmacist. In this case, the dispensing mechanism in each vending machine can only be activated by a pharmacist at the service center. The individual contacts a pharmacist at the service center either using his mobile telephone or using the vending machine's communication device and describes to the pharmacist his requirements for a medical item. The pharmacist then informs the individual of a medical item offered for sale at the vending machine meeting the individual's needs. When the pharmacist has approved the sale of a medical item to the individual, the pharmacist sends a message to the vending machine informing the vending machine of the approved item. The message will also instruct the vending machine to prompt the individual to pay for the selected item. The message also instructs the vending machine to activate a dispensing mechanism associated with the vending machine after receipt of payment. In the absence of this message from the pharmacist to the vending machine, the dispensing mechanism cannot be activated, and it is not possible for the individual to obtain a medical item from the vending machine. In this way, the individual can only purchase a medical item from the vending machine whose sale from the vending machine has been, approved by a service center pharmacist.

Thus, in its first aspect, the invention provides a system for selling medical items comprising:
(a) one or more vending machines;
(b) a service center provided with one or more communication devices; and
(c) a communications network configured to allow communication between a communication device located at a vending machine and a communication device located at the service center.

In its second aspect, the invention provides a method for selling medical items comprising:
(a) providing one or more vending machines;
(b) providing a service center having one or more communication devices; and
(c) providing a communications network configured to allow communication between a communication device located at a vending machine and a communication device located at the service center.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF THE INVENTION

Figure 1:
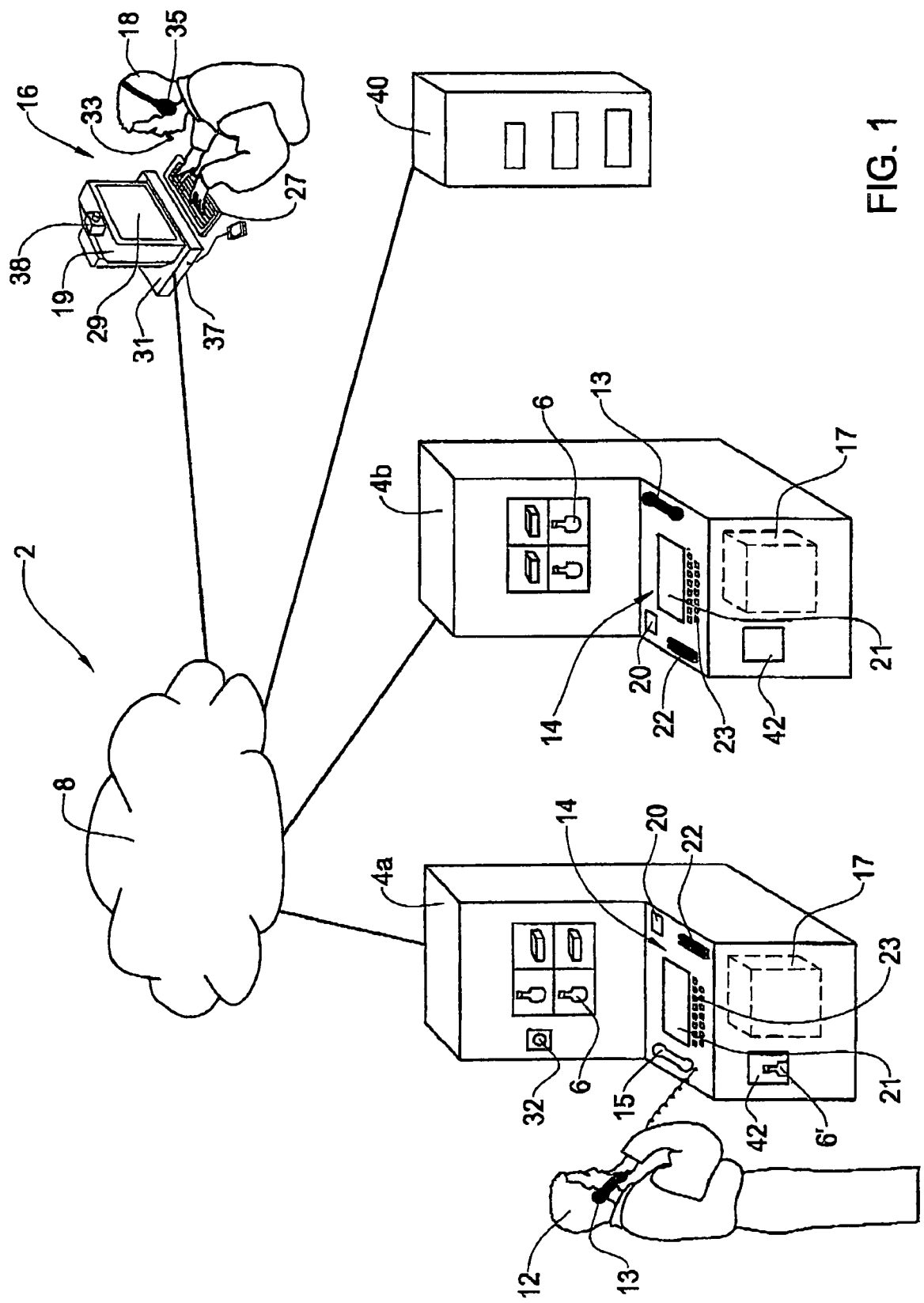
FIG. 1 shows a system for the sale of medical items in accordance with one embodiment of the invention.

FIG. 1 shows a system 2 for vending medical items in accordance with one embodiment of the invention. The system 2 comprises one or more vending machines 4 offering one or more medical items 6 for sale. Two vending machines 4a and 4b are shown in FIG. 1. This is by way of example only and the invention may be carried out using a system comprising any number of vending machines 4.

In the system 2 shown in FIG. 1, each of the vending machines 4 is provided with a communication device 14. The communication device 14 allows an individual 12 wishing to make a purchase of a medical item 6 from a vending machine 4 to communicate with a pharmacist 18 located at a service center 16. In an alternative embodiment (not shown), the vending machines 4 are not provided with a communication device. In this case, an individual contemplating the purchase of a medical item 6 from the vending machine communicates with the service center using his personal mobile telephone.

Communication between the communication device 14 and a communication device 19 located at the service 16 is over a communication network indicated by the cloud 8. For example, the communication network 8 may be a wired network such as a public switched telephone network (PSTN), In which case the communication device 14 is a telephone wired to the communication system 8. Alternatively, the communication network 8 may be a wireless communication network e.g. a cellular telephone network, in which case the communication device is a wireless telephone. In the system 2 shown in FIG. 1, the communication network 8 is a computer network such as the Internet, an Intranet or a local access network (LAN). In this case the communication device 14 includes a computer terminal, and a hand-held unit 13 comprising a microphone and a speaker. The computer terminal of the vending machine 4 includes a processor 17 located inside each vending machine 4, a display screen 21 and a computer input device such as a keyboard 23. Alternatively or additionally, the screen 21 may be a touch screen that also serves as a computer input device. Similarly, the communication device 19 includes a computer terminal 31, a microphone 33 and a speaker 35. The computer terminal includes a processor 37, a display screen 29 and a computer input device such as a keyboard 23. Alternatively or additionally, the screen 29 may be a touch screen that also serves as a computer input device. In a preferred embodiment, the communication devices 14 and 19 include a video camera, 32 and 38, respectively, that allow the individual 12 and the pharmacist 18 to view each other on their display screens 21 and 29, respectively, by video conferencing during communication between the individual 12 and the pharmacist 18.

Figure 2:
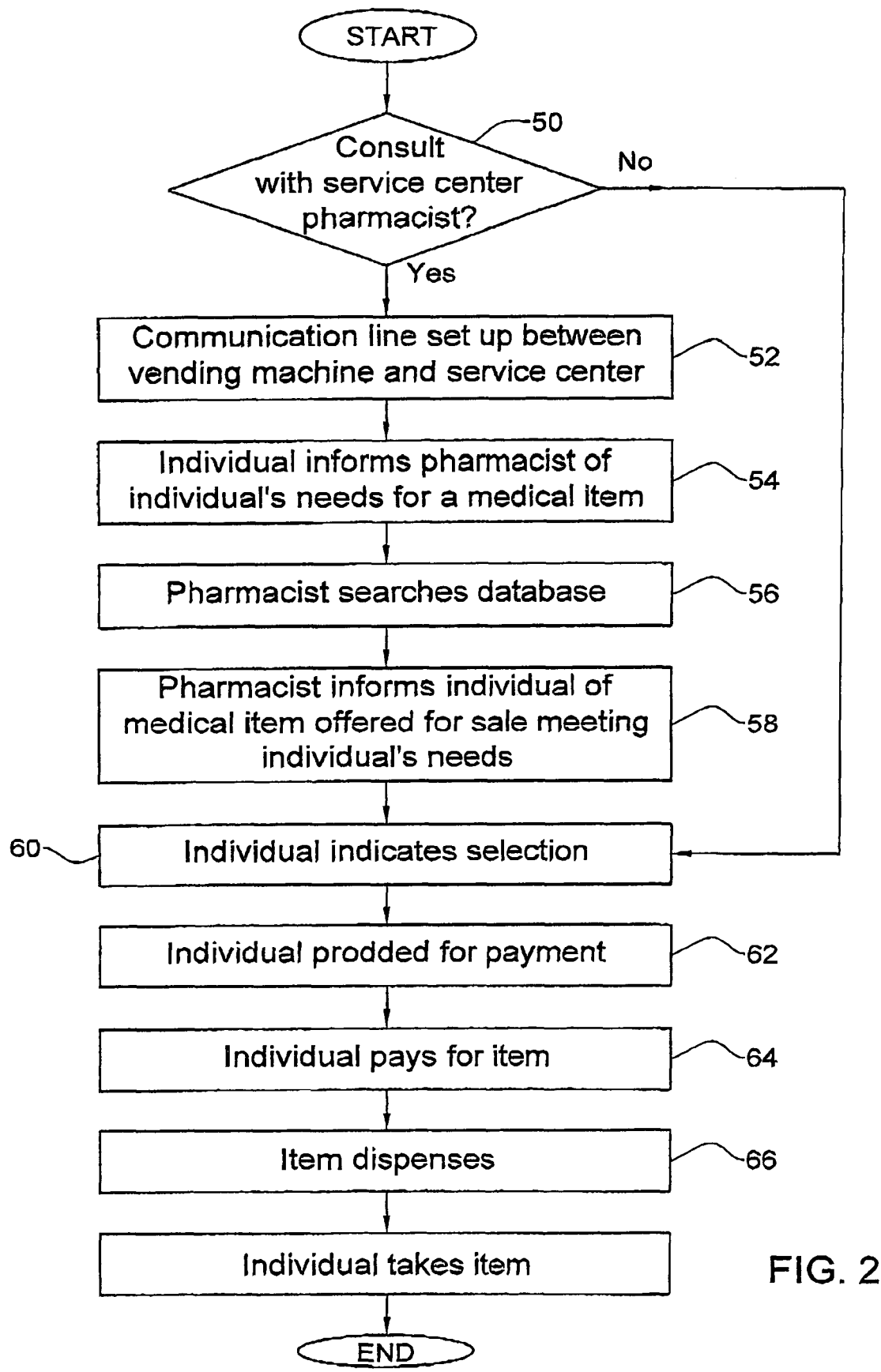
FIG. 2 shows a method for the sale of medical items in accordance with one embodiment of the invention.

FIG. 2 shows a flow chart for one embodiment of the method of the invention. When an individual, such as the individual 12 considering a purchase of a medical item from one of the vending machines 4, such as the vending machine 4a, approaches the vending machine, the individual is prompted by a message appearing on the screen 21 whether or not he wishes to consult with a pharmacist at the service center 16 (step 50). The individual 21 inputs his response to the processor using a computer input device such as the keyboard 23 or the screen 21, if it is a touch screen. The individual 12 may decide to contact the pharmacist 18 if, for example, the individual 12 is not certain which of the medical items 6 offered for sale by the vending machine 4 is most suitable for his needs. This would be the case, for example, if the subject 12 is in a locality, such as a foreign country, where he is not familiar with locally available medical items, or cannot read the labels of the medical items offered for sale. If the individual indicates that he wishes to consult with a service center pharmacist, then at step 52 a communication line is established over the communication network 8 between the vending machine communication device 14 and the service center communication device 19. The individual 12 informs the pharmacist 18 as to the individual's need for a medical item, for example, a particular medical problem that the individual 12 has (step 54). Additionally or alternatively, the individual 12 may inform the pharmacist 18 of the brand name of a medicine that the subject has previously used for the treatment of his medical problem (and that is not offered for sale by the vending machine 4a) and request the pharmacist to recommend a substitute medical item similar to the submitted brand name that is offered for sale by the vending machine 4a. The pharmacist 18 may have access to a database for retrieving information relating to medical items. The database may be located in the memory of the service center processor 37. Alternatively, the database may be a database 40 accessible at the service center communication device 19 over the communication network 8. In step 56 the pharmacist optionally searches the database in response to information provided by the individual. For example, if the individual 12 informs the pharmacist 18 of the brand name of a drug that be has taken in the past, the pharmacist may consult the database to determine what the active ingredient is of the submitted brand name, and then search the database for a drug offered for sale at the vending machine 4a having that active ingredient, and then inform the individual 12 of the drug over the communications network. The pharmacist then in forms the individual of a medical item offered for sale at the vending machine (step 58).

When the individual 12 has decided which medical item 6 to purchase from the vending machine 4a, in step 60 he indicates his selection to the processor 17 using an input device such as the keyboard 23 or the screen 21 if it is a touch screen. The processor 17 will then display a message on the screen 21 prompting the individual 12 to pay for the selected item (step 62). In step 64, the individual pays for the item, for example by inserting currency into a slot 20, or by swiping a credit card in a credit card reader 22 (FIG. 1). After receipt of the payment, the processor 17 activates a dispensing mechanism (not shown) associated with the vending machine 4 that dispenses the purchased from the vending machine to a dispensing opening 42 in the vending machine (step 66). Finally, in step 66, the individual 12 removes the dispensed item 6' from the dispensing opening 42, and the transaction is completed.

If at step 50 the individual indicates that he does not wish to consult with a pharmacist, the process continues at step 60 with the individual indicating the medical item be wishes to purchase from the vending machine.

Figure 3:
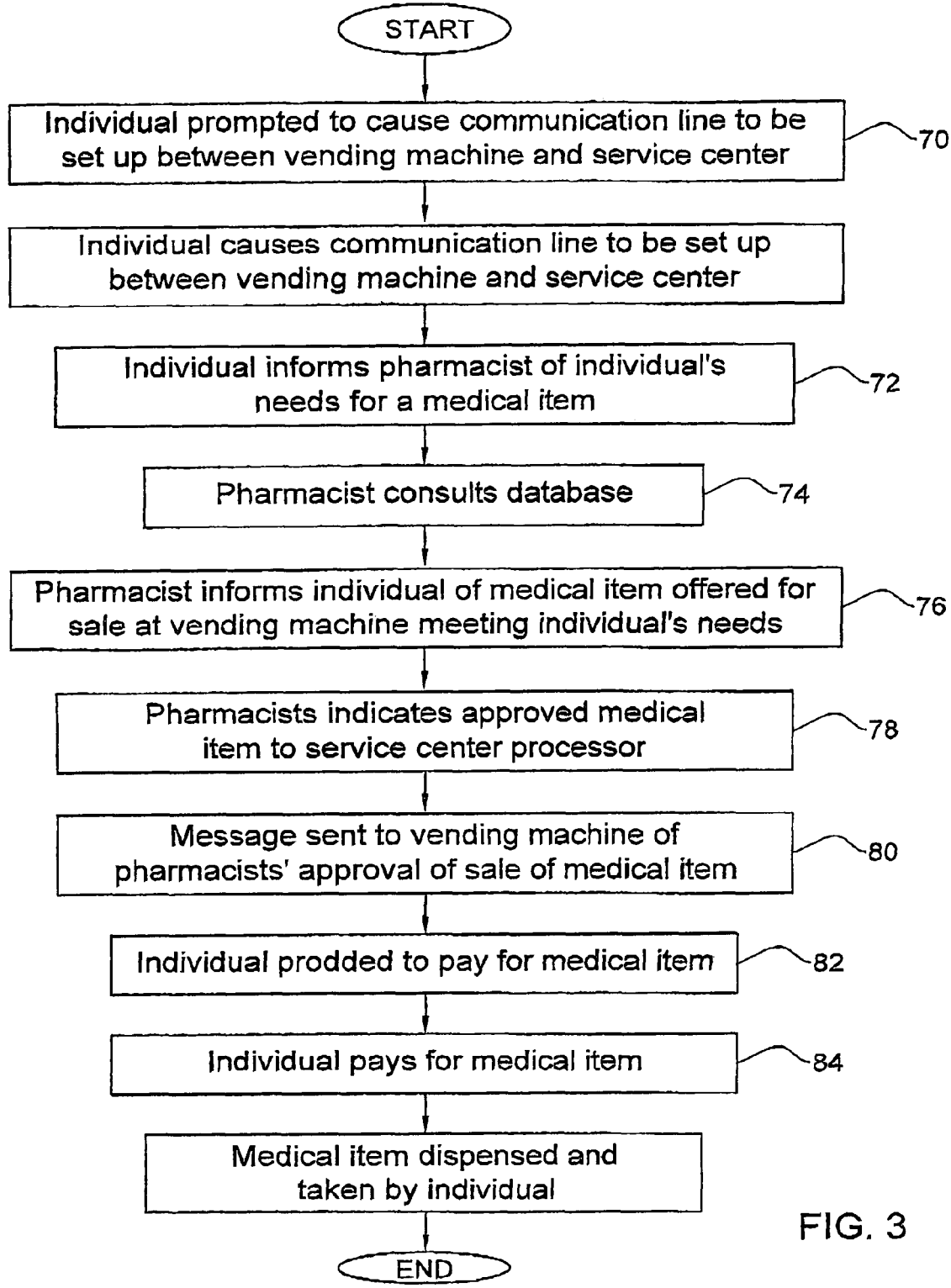
FIG. 3 shows a method for the sale of medical items in accordance with another embodiment of the invention.

FIG. 3 shows a flow chart for another embodiment of the method of the invention. The embodiment of FIG. 3 may be used in locations where purchasing of any one of the medical items 6 requires approval from a pharmacist. In this case, the dispensing mechanism in each vending machine can only be activated by the processor 17 when it receives a message from the processor 37 of the service center 16 instructing it to do so. As indicated in FIG. 3, in this case, a message appears on the screen 21 prompting the individual 12 to cause a communication line to be set up over the communication network 3 between the vending machine and the service center (step 70). In response, the individual causes a communication line to be set up between the vending machine and the service center (step 72). This may be done, for example, simply by the individual removing the hand-held unit 13 from its cradle 15. In step 74, the individual contacts the pharmacist 13 over the communications network 8 and describes to the pharmacist 18 his requirements for a medical item. The pharmacist 18, in step 74, may optionally consult a database, as explained above, in order to determine the medical item 6 most suitable to the individual's requirements from among the items offered for sale at the vending machine. The pharmacist then informs the individual of a medical item offered for sale at the vending machine meeting the individual's needs (step 76). When the pharmacist has approved the sale of an item 6 to the individual, the pharmacist 18 indicates the approved item to the service center processor 37 using an input device such as the keyboard 27 or screen 29 if it is a touch screen. The processor 37, in step 80, then sends a message to the processor 17 of the vending machine informing the processor 17 of the approved item, and possibly the cost of the approved item, if the price has not been previously stored in a memory of the processor 17. The message will also instruct the processor 17 to display a message on the screen 21 prompting the individual 12 to pay for the selected item. The message also instructs the processor 17 to activate a dispensing mechanism (not shown) associated with the vending machine after receipt of payment. In the absence of this message from the processor 37 to the processor 17, the dispensing mechanism cannot be activated, and it is not possible for the individual to obtain a medical item 6 from the vending machine. In this way, the individual 12 can only acquire a medical item from the vending machine whose sale from the vending machine has been approved by a service center pharmacist. The message prompting the individual to pay for the medical item is then displayed on the screen 21, (step 82), and the individual then pays for the item (step 84), for example by inserting currency into the slot 20, or by swiping a credit card in the credit card reader 22 (FIG. 1). After receipt of the payment, in step 86, the processor 17 activates the dispensing mechanism associated with the vending machine 4 that dispenses the purchased item from the vending machine to the dispensing opening 42 (FIG. 1) in the vending machine. The individual 12 then removes the dispensed item 6' from the dispensing opening 42, and the transaction is completed.

The invention claimed is:

1. A method for selling medical items comprising:
   (a) providing at least one vending machine;
   (b) providing a service center having at least one communication device;
   (c) providing a communications network configured to allow communication between a communication device located at a vending machine and a communication device located at the service center; and
   (d) at a processor accessible over the communications network:
      (i) for a specified vending machine from among the at least one vending machine, receiving as an input at least one search criteria relating to items offered for sale at the specified vending machine; and
      (ii) searching a searchable database related to medical items offered for sale at the at least one vending machine, for at least one item offered for sale at the specified vending machine satisfying the input search criteria; and
      (iii) communicating identification of the at least one item which satisfied the input search criteria to a user at the specified vending machine; and
   (d) wherein one or more of the search criteria are selected from any one or more of the following:
      (i) a medical item having an input active ingredient;
      (ii) a medical item for use in one or more input medical indications;
      (iii) a medical item having an active ingredient found in an input medical item having an input brand name;
      (iv) a medical item for use treatment of one or more medical indications treatable by a medical item having a predetermined brand name;
      (v) a medical item having a composition found in a medical item having an input brand name; and
      (vi) a medical item having a composition found in an input medical item having the input brand name.

2. The method according to claim 1 further comprising providing instructions for contacting the service center using a mobile telephone.

3. The method according to claim 1 further comprising providing a communication device integral with a vending machine.

4. The method according to claim 1 wherein the communication is selected from a wired telephone network, a wireless telephone network, or a computer network.

5. The method according to claim 1 wherein one or more of the communication devices is a wired telephone, a wireless telephone, or a computer terminal.

6. The method according to claim 1 wherein one or more of the communications devices includes a video camera for video conferencing between an individual located at a vending machine and an individual located at the service center.

7. The method according to claim 1 further comprising displaying a message at a vending machine prompting an individual to contact the service center from the vending machine over the communication method.

8. The method according to claim 1 further comprising:
   (a) inputting to a vending machine a command to set up a communication line between the vending machine and the service center; and
   (b) setting up a communication line between the vending machine and the service center when a command is received to set up a communication line between the vending machine and the service center.

9. The method according to claim 1 further comprising inputting to a vending machine an indication from the service center approving a sale of a medical item from the vending machine.

10. The method according to claim 9 further comprising dispensing a medical item from the vending machine only after receiving an indication from the service center approving the sale of the medical item.

11. A system for selling medical items comprising:
    (a) at least one vending machine;
    (b) a searchable database relating to medical items offered for sale at the at least one vending machine; and
    (c) a processor configured to:
       (i) for a specified vending machine from among the at least one vending machine, receive as an input one or more search criteria relating to items offered for sale at the specified vending machine; and (ii) search the database for one or more items offered for sale at the specified vending machine satisfying the input search criteria; and (d) wherein one or more of the search criteria are selected from any one or more of the following:

(i) a medical item having an input active ingredient;

(ii) a medical item for use in one or more input medical indications;

(iii) a medical item having an active ingredient found in an input medical item having an input brand name;

(iv) a medical item for use treatment of one or more medical indications treatable by a medical item having a predetermined brand name;

(v) a medical item having a composition found in a medical item having an input brand name; and (vi) a medical item having a composition found in an input medical item having the input brand name.

12. The system according to claim 11 for selling medical items further comprising:

(a) a service center provided with one or more communication devices; and (b) a communications network configured to allow communication between a communication device located at a vending machine and a communication device located at the service center.

13. The system according to claim 12 further comprising instructions for contacting the service center using a mobile telephone.

14. The system according to claim 13 wherein the database is searchable from a terminal located at the service center.

15. The system according to claim 12 wherein a communication device located at a vending machine is integral with the vending machine.

16. The system according to claim 12 wherein the communication network is a wired telephone network, a wireless telephone network, or a computer network.

17. The system according to claim 12 wherein one or more of the communication devices is a wired telephone, a wireless telephone, or a computer terminal.

18. The system according to claim 12 wherein one or more of the communications devices includes a video camera for video conferencing between an individual located at a vending machine and an individual located at the service center.

19. The system according to claim 12 wherein the database is searchable from a terminal located at the service center.

20. The system according to claim 12 wherein a vending machine comprises a processor configured to display a message prompting an individual to contact the service center from the vending machine over the communication system.

21. The system according to claim 12 wherein a vending machine comprises a processor configured to receive as an input from an individual at the vending machine a command to set up a communication line between the vending machine and the service center, and is further configured to set up a communication line between the vending machine and the service center when a command is received to set up a communication line between the vending machine and the service center.

22. The system according to claim 12 wherein a vending machine comprises a processor configured to receive as an input an indication from the service center approving a sale of a medical item from the vending machine, and the vending machine is further configured to dispense a medical item only after receiving an indication from the service center approving the sale of the medical item.

23. The system according to claim 11 wherein the database includes, for each of one or more medical items offered for sale at at least one of the vending machines, data relating to any one or more of the following:

(a) an active ingredient of the medical item;

(b) a brand name of the medical item;

(c) one or more medical indications for which the medical item may be used; and (d) brand names of alternative medical items containing an active ingredient equivalent.

24. The system according to claim 11 wherein the database is searchable from a terminal located at one of the vending machines.

* * * * *